United States Patent
Hinman et al.

(10) Patent No.: US 7,072,385 B1
(45) Date of Patent: *Jul. 4, 2006

(54) LOAD COIL AND DSL REPEATER INCLUDING SAME

(75) Inventors: Brian L. Hinman, Los Gatos, CA (US); Andrew L. Norrell, Nevada City, CA (US); James Schley-May, Nevada City, CA (US); Carl Alelyunas, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 09/670,475

(22) Filed: Sep. 26, 2000

Related U.S. Application Data (60) Provisional application No. 60/212,597, filed on Jun. 19, 2000, provisional application No. 60/184,392, filed on Feb. 23, 2000.

(51) Int. Cl.
*H04B 17/02* (2006.01)

(52) U.S. Cl. .................... 375/211; 375/258; 379/30; 379/377

(58) Field of Classification Search ............... 375/211, 375/258; 379/377, 29.11, 30; 370/492
See application file for complete search history.

(56) References Cited

U.S. PATENT DOCUMENTS

| | | | |
|---|---|---|---|
| 761,995 A | 6/1904 | Pupin | |
| 1,711,653 A | 5/1929 | Quarles | |
| 3,180,938 A | 4/1965 | Glomb | 179/15 |
| 3,476,883 A | 11/1969 | Birck et al. | |

(Continued)

OTHER PUBLICATIONS

"Reference Data for Radio Engineers", Published by the Federal Telephone and Radio Corporation as associate of International Telephone and Telegraph Corporation, Copyright 1943, pp. 3.

(Continued)

*Primary Examiner*—Shuwang Liu
(74) *Attorney, Agent, or Firm*—Blakely, Sokoloff, Taylor & Zafman LLP

(57) ABSTRACT

Systems and methods are disclosed for improving DSL performance, including ADSL and VDSL performance, over a local loop between a telephone company central office and a customer premises. In particular, a DSL repeater is coupled to the local loop and amplifies downstream and upstream DSL signals to at least partially compensate for DSL signal attenuation that occurs as DSL signals pass over the local loop.

Pursuant to one embodiment, the DSL repeater includes a POTS load coil to improve the POTS, or voice band, transmission over the local loop. According to this embodiment, the DSL repeater provides both improved POTS band signal transmission and DSL service.

One embodiment of the load coil includes a coupled inductor having compensating capacitors coupled thereto for counter-balancing the inter-winding capacitance of the coupled inductor. In another embodiment, the load coil includes a high intra-winding capacitance for counter-balancing the inter-winding capacitance of a coupled inductor. Pursuant to yet another embodiment, the load coil comprises a pair of discrete, uncoupled inductors and a low intra-winding capacitance. Still another embodiment includes a pair of discrete, uncoupled inductors having a pair of compensating capacitors coupled thereto for counter-balancing the intra-winding capacitance of the uncoupled inductors. Reducing, eliminating, or counter-balancing the capacitance of the load coil improves the impedance of the load coil to DSL signals improved, thereby permitting sufficient gain to be developed across the load coil.

5 Claims, 11 Drawing Sheets

U.S. PATENT DOCUMENTS

| | | | |
|---|---|---|---|
| 3,548,120 A | 12/1970 | Tarassoff | 179/170.4 |
| 3,578,914 A | 5/1971 | Simonelli | |
| 3,848,098 A | 11/1974 | Pinel | |
| 3,873,936 A | 3/1975 | Cho | 330/124 R |
| 3,944,723 A | 3/1976 | Fong | 178/3 |
| 3,962,549 A | 6/1976 | Zuk | 179/16 EA |
| 4,025,737 A | 5/1977 | Brewer | 179/175.31 R |
| 4,131,859 A | 12/1978 | Valle | 330/124 R |
| 4,242,542 A | 12/1980 | Kimbrough | 179/170 R |
| 4,259,642 A | 3/1981 | Derby | |
| 4,277,655 A | 7/1981 | Surprenant | |
| 4,392,225 A | 7/1983 | Wortman | 370/75 |
| 4,462,105 A | 7/1984 | Wagner et al. | 375/8 |
| 4,583,220 A | 4/1986 | Blackburn et al. | 370/74 |
| 4,633,459 A | 12/1986 | Blackburn | 370/13 |
| 4,656,628 A | 4/1987 | Tan | 370/85 |
| 4,667,319 A | 5/1987 | Chum | 370/55 |
| 4,766,606 A | 8/1988 | Bardutz et al. | 379/344 |
| 4,768,188 A | 8/1988 | Barnhart et al. | |
| 4,788,657 A | 11/1988 | Douglas et al. | |
| 4,970,722 A | 11/1990 | Preschutti | |
| 5,049,832 A | 9/1991 | Cavers | |
| 5,095,528 A | 3/1992 | Leslie et al. | |
| 5,181,198 A | 1/1993 | Lechleider | 370/32.1 |
| 5,394,401 A | 2/1995 | Patrick et al. | 370/85.5 |
| 5,455,538 A | 10/1995 | Kobayashi et al. | 330/149 |
| 5,526,343 A | 6/1996 | Aizawa et al. | 370/13.1 |
| 5,623,485 A | 4/1997 | Bi | |
| 5,724,344 A | 3/1998 | Beck | |
| 5,726,980 A | 3/1998 | Rickard | 370/293 |
| 5,736,949 A | 4/1998 | Ong et al. | |
| 5,790,174 A | 8/1998 | Richard, III et al. | |
| 5,822,325 A | 10/1998 | Segaram et al. | 370/501 |
| 5,859,895 A | 1/1999 | Pomp et al. | |
| 5,892,756 A | 4/1999 | Murphy | |
| 5,909,445 A | 6/1999 | Schneider | |
| 5,912,895 A | 6/1999 | Terry et al. | |
| 5,929,402 A | 7/1999 | Charles et al. | |
| 5,974,137 A | 10/1999 | Sheets et al. | 379/347 |
| 5,991,311 A | 11/1999 | Long et al. | |
| 6,005,873 A | 12/1999 | Amit | |
| 6,029,048 A | 2/2000 | Treatch | |
| 6,047,222 A | 4/2000 | Burns et al. | |
| 6,058,162 A | 5/2000 | Nelson et al. | |
| 6,084,931 A | 7/2000 | Powell, II et al. | |
| 6,091,713 A | 7/2000 | Lechleider et al. | |
| 6,091,722 A | 7/2000 | Russell et al. | |
| 6,128,300 A | 10/2000 | Horton | |
| 6,154,524 A | 11/2000 | Bremer | |
| 6,188,669 B1 | 2/2001 | Bellenger | |
| 6,195,414 B1 | 2/2001 | Simmons et al. | |
| 6,208,670 B1 | 3/2001 | Milliron et al. | |
| 6,226,322 B1 | 5/2001 | Mukherjee | |
| 6,236,664 B1* | 5/2001 | Erreygers | 370/492 |
| 6,236,714 B1 | 5/2001 | Zheng et al. | |
| 6,246,695 B1 | 6/2001 | Seazholtz et al. | |
| 6,262,972 B1 | 7/2001 | McGinn et al. | |
| 6,263,047 B1 | 7/2001 | Randle et al. | |
| 6,266,348 B1 | 7/2001 | Gross et al. | |
| 6,266,395 B1 | 7/2001 | Liu et al. | |
| 6,278,769 B1* | 8/2001 | Bella | 379/29.11 |
| 6,281,454 B1 | 8/2001 | Charles et al. | |
| 6,301,337 B1* | 10/2001 | Scholtz et al. | 379/30 |
| 6,343,114 B1 | 1/2002 | Chea, Jr. | |
| 6,345,071 B1 | 2/2002 | Hamdi | |
| 6,345,072 B1 | 2/2002 | Liu et al. | |
| 6,351,493 B1 | 2/2002 | Reed | |
| 6,370,188 B1 | 4/2002 | Wu et al. | |
| 6,385,234 B1 | 5/2002 | Ashley | |
| 6,385,252 B1 | 5/2002 | Gradl | |
| 6,385,253 B1 | 5/2002 | Swisher | |
| 6,507,606 B1 | 1/2003 | Shenoi et al. | |
| 6,546,100 B1 | 4/2003 | Drew | |
| 6,658,049 B1* | 12/2003 | McGhee et al. | 375/211 |
| 2002/0001340 A1 | 1/2002 | Shenoi et al. | |
| 2002/0106076 A1 | 8/2002 | Norrell et al. | |
| 2002/0113649 A1 | 8/2002 | Tambe et al. | |

OTHER PUBLICATIONS

Todd Baker, "The Challenges of Implementing", Tektronix, Oct. 1998 CTE Report, http://www.tektronix.org/Measurement/commtest/cte_reports/27/xdsl.html?view=print&page=http://ww, pp. 5.

Vince Vittore, "Telephony Making DSL go for the long run", http://industryclick.com/magazinearticle.asp?magazinearticleid=7521&magazineid=7&mode=print, Dec. 11, 2000, pp. 2.

"Smart Coil™ —The line conditioner for the digital age! Smart Coils Condition copper pairs for deployment of both ADSL (data) and toll-quality voice services on the same line", Charles a registered Trademark of Charles Industries, LTD., pp. 2.

Rhombus Industries, Testing Inter-Winding Capacitance, 1997.

Delta Products Corporation, Transformer General Parameters.

"Design Idea DI-61 TinySwitch® 11-3 W. Charger: <200 MW No-load Consumption", Power® Integrations, www.powerint..com, Mar. 2004, pp. 2 total.

Data Sheet, "Lundahl Transformers, Tube amplifier transformers", http://www.lundahl.se/tubes.html, Apr. 13, 2004, pp. 1-7.

"TechWeb" TechEncyclopedia, http://www.techweb.com/encyclopedia, Apr. 16, 2004, pp. 1-4.

Nathan R. Grossner, "The Wide-Band Transformer: Synthesis", and "The Pulse Transformer: Analysis", Transformers for Electronic Circuits, Copyright © 1967, by McGraw-Hill, pp. 225-252.

* cited by examiner

LOAD COIL AND DSL REPEATER INCLUDING SAME

CROSS REFERENCE TO RELATED APPLICATIONS

This application relates to and claims the priority of commonly assigned U.S. Provisional Patent Application No. 60/184,392 filed on Feb. 23, 2000 and entitled "Mid-Span Repeater for ADSL" by Brian L. Hinman, and U.S. patent application Ser. No. 09/569,470, filed on May 12, 2000 and entitled "DSL Repeater" by Brian L. Hinman, Andrew L. Norrell, and James Schley-May, U.S. Provisional Patent Application No. 60/212,597, filed on Jun. 19, 2000, which converted to U.S. Pat. No. 6,977,958, issued on Dec. 20, 2005 and is entitled "DSL Repeater" by Brian L. Hinman, Andrew L. Norrell, and James Schley-May, and U.S. patent application Ser. No. 09/610,788, filed Jul. 6, 2000 and entitled "DSP-Based Repeater for DSL Signals" by Brian L. Hinman, Andrew L. Norrell, and James Schley-May. The disclosures of these related applications are hereby incorporated by reference.

BACKGROUND

1. Technical Field

The present disclosure relates generally to load coils, and more particularly to a load coil having an improved frequency response in the DSL signal band.

2. Description of Background Art

One method of accessing the Internet is by using DSL (xDSL) technology, which has several varieties, including ADSL and VDSL versions. ADSL is one version of DSL technology that expands the useable bandwidth of existing copper telephone lines. ADSL is "asymmetric" in that ADSL reserves more bandwidth in one direction than in the other, which may be beneficial for users who do not require equal bandwidth in both directions. In one implementation, ADSL signals generally occupy the frequency band between about 25 kHz and 1.104 MHz. In this configuration, ADSL uses the frequency band between about 25 kHz and 120 kHz to transmit upstream signals (signals from a customer premises to a central office) and the frequency band between about 150 kHz to 1.104 MHz to transmit downstream signals (signals from the central office to a customer premises).

ADSL employs Frequency Division Multiplexing (FDM) to separate upstream and downstream signals and to separate ADSL signals from POTS (Plain Old Telephone Service) band signals, which reside below about 4 kHz. VDSL also uses FDM to separate downstream and upstream channels as well as to separate both downstream and upstream channels from POTS.

In the past, ADSL has been used to deliver high-speed data services to subscribers up to about 18,000 feet from their serving central office or central office extension. The potential data rates range from above about 8 MBPS for short loops, but drop off dramatically on long loops, such as local loops over about 18,000 feet, to about 0.5 MBPS or less. Conventionally, ADSL service generally employs a local loop length of about 6,000–14,000 feet for optimal service. Loop length is generally defined as the length of the wire between the central office, or central office extension, and the customer premises, such as a home or business. "Central office" and "central office extension" are collectively referred to herein as "central office."

DSL signals generally degrade as they traverse the local loop. Hence, the longer the local loop length, the more degraded the DSL signal will tend to be upon arriving at a central office or a customer premises. While some DSL service is conventionally possible with loop lengths longer than 14,000 feet, it has been found that with loops much longer than about 14,000 feet, the DSL signal is too degraded to provide high data transfer rates.

DSL signal degradation over a local loop may be caused, for example, by factors such as: signal attenuation, crosstalk, thermal noise, impulse noise, and ingress noise from commercial radio transmitters. The dominant impairment, however, is often signal attenuation. For example, a transmitted ADSL signal can suffer as much as 60 dB or more of attenuation on long loops, which substantially reduces the useable signal, thereby greatly reducing potential data rates.

Additional details regarding DSL signal degradation over long loops and regarding DSL technology more generally are described in *Understanding Digital Subscriber Line Technology* by Starr, Cioffi, and Silverman, Prentice Hall 1999, ISBN 0137805454 and in *DSL—Simulation Techniques and Standards Development for Digital Subscriber Line Systems* by Walter Y. Chen, Macmillan Technical Publishing, ISBN 1578700175, the disclosures of which are hereby incorporated by reference.

SUMMARY

A DSL repeater is provided along a local loop between a central office and a customer premises for amplifying DSL signals, such as VDSL or Category 1 ADSL signals, that pass between the central office and the customer premises to reduce, or alleviate DSL signal degradation problems due to signal attenuation. In general, the DSL repeater amplifies upstream and downstream DSL signals to at least partially compensate for attenuation of the DSL signals as they traverse a local loop.

The DSL repeater may be configured as a non-regenerative repeater, including an upstream amplifying stage or element, an upstream filter, a downstream amplifying stage or element, and a downstream filter. The amplifying elements and filters are disposed between a pair of electromagnetic hybrids, which couple the repeater to the local loop. The upstream and downstream amplifying elements respectively amplify upstream and downstream DSL signals. The downstream filter substantially prevents upstream signals from being transmitted back to the customer premises and the upstream filter substantially prevents downstream signals from being transmitted back to the central office.

The DSL repeater includes the load coil, also referred to as a loading coil, to provide impedance to DSL signals while improving transmission of POTS signals over the loop. The DSL repeater equalizing and amplifying components generally equalize and amplify the DSL frequencies found on the loop at one side of the load coil and present them to the loop segment on the opposite side of the load coil. For example, at about 1.1. MHz, there can be as much as 40 dB of gain, or difference, between one side of the load coil and the other. Consequently, it is desirable for the load coil to present a high impedance to DSL signals to improve development of significant voltage difference across the load coil.

The capacitance of conventional load coils, however, generally limits the ability of conventional load coils to provide sufficient impedance to DSL signals so that a desired gain can be developed across the load coil. Indeed, a conventional load coil typically comprises a coupled inductor having first and second windings wrapped around an electromagnetic core. Such a conventional load coil typically provides about 88 mH of inductance, about 10 pF of intra-winding capacitance, and about 1,040 pF of inter-winding capacitance. Intra-winding capacitance generally refers to the capacitance between the loops of the same winding and is measured between the legs of one winding. Inter-winding capacitance generally refers to the capacitance between the first and second windings and is measured between opposite legs of two windings. Thus, in conventional load coils, the ratio of inter-winding capacitance to intra-winding capacitance may be between about 10:1 to 100:1. This net effective capacitance, however, significantly limits the ability of a conventional load coil to have sufficient impedance to high frequencies permit the desired voltage difference, or gain, to be developed across the load coil for frequencies in the ADSL band, which is about 25 kHz–1.1 MHz.

In general, the capacitively coupled current at DSL frequencies passing through the load coil is significantly reduced by balancing the effective intra-winding and inter-winding capacitances. This, balancing may be accomplished, for example, by increasing the intra-winding capacitance to substantially match the inter-winding capacitance, by adding compensating capacitors to counter-balance inter-winding or intra-winding capacitance. Moreover, the load coil may be configured as either a coupled inductor or as a pair of discrete, uncoupled inductors.

In one embodiment, the present load coil includes a pair of compensating capacitors to counter-balance the inter-winding capacitance of the windings, thereby increasing the effective intra-winding capacitance. Advantageously, each compensating capacitor will have a capacitance that approximates the inter-winding capacitance of the coupled inductor, minus the intra-winding capacitance. For example, each compensating capacitor of the coupled inductor will have a capacitance in the range of about 700–1300 pF and preferably in the range of about 1020–1040 pF for a coupled inductor having an inter-winding capacitance of about 1040 pF and intra-winding capacitance of 10 pF. The compensating capacitors generally overcome or substantially alleviate the undesirable effects of the inter-winding capacitance. In particular, by adding the compensating capacitors, the capacitively conducted current passing through the load coil at DSL frequencies is substantially reduced.

In another embodiment, the present load coil has sufficient intra-winding capacitance to substantially counter-balance the inter-winding capacitance. As mentioned above, conventional load coils typically have an inherent, or intrinsic, intra-winding capacitance of about 10 pF. According to this embodiment, the load coil would have an intra-winding capacitance of between about 700–1300 pF and preferably in the range of about 1030–1050 pF for a coupled inductor having an inter-winding capacitance of about 1040 pF. That is, the ratio of the inter-winding capacitance to the intra-winding capacitance should be in the range of about 0.75–1.25 and preferably in the range of about 0.99–1.01. By effectively balancing the effective inter-winding and inter-winding capacitances, the capacitively conducted current passing through the load coil at DSL frequencies is substantially reduced.

According to yet another embodiment, both increased intra-winding capacitance and compensating capacitors are used to counter-balance the inter-winding capacitance of the load coil. Pursuant to this embodiment, the ratio of the combined intra-winding capacitance and the capacitance of the compensating capacitors to the inter-winding capacitance should be in the range of about 0.75–1.25 and preferably in the range of about 0.99–1.01.

Pursuant to still another embodiment, a load coil is provided having a pair of discrete, uncoupled inductors with each of the uncoupled inductors having a sufficiently low intra-winding capacitance that the intra-winding capacitance does not prevent the load coil from presenting sufficient impedance to ADSL signals so that significant gain may be developed across the load coil. By employing uncoupled inductors instead of coupled inductors, the inter-winding capacitance is substantially eliminated. Thus, with this embodiment, little current at DSL frequencies is capacitively conducted through the load coil due to the low inter-winding and intra-winding capacitances.

In yet still another embodiment, a load coil is provided having a pair of discrete, uncoupled inductors with each of the uncoupled inductors having significant intra-winding capacitance. A pair of compensating capacitors are coupled to opposite legs between the discrete inductors to counter-balance the intra-winding capacitance and thereby permit the load coil to present sufficient impedance to ADSL signals so that significant gain may be developed across the load coil. Each of the compensating capacitors advantageously has a capacitance that approximates the intra-winding capacitance of one of the discrete inductors. Hence, by balancing the intra-winding capacitance with the compensating capacitors, the amount of capacitively coupled current passing through the load coil at DSL frequencies is substantially reduced.

Other advantages, features, and embodiments will be apparent from the drawings and detailed description as set forth below.

DETAILED DESCRIPTION

Figure 1:
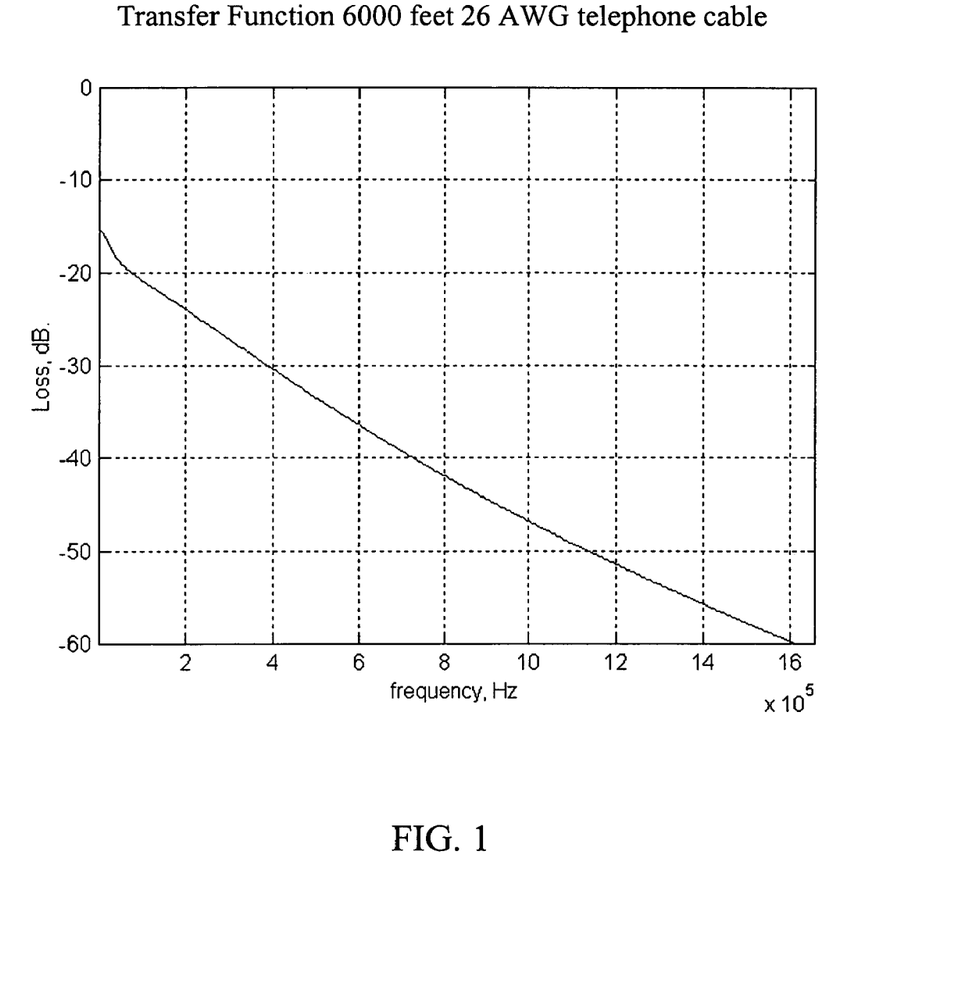
FIG. 1 is a graph illustrating one example of DSL signal attenuation over a 6,000-foot length of telephone cable as a function of signal frequency.

FIG. 1 illustrates an example of the attenuation of a DSL signal over 6,000 feet of 26 AWG (American Wire Gauge) telephone cable. As shown, higher frequency signals are generally attenuated more than lower frequency signals. In the FIG. 1 example, a 25 kHz signal is attenuated by about 25 dB over 6,000 feet of 26 AWG telephone cable while a 1 MHz signal is attenuated by about 46 dB over 6,000 feet of 26 AWG telephone cable. As those skilled in the art will appreciate, the actual degree of attenuation will also depend on factors in addition to loop length, such as temperature.

Figure 2:
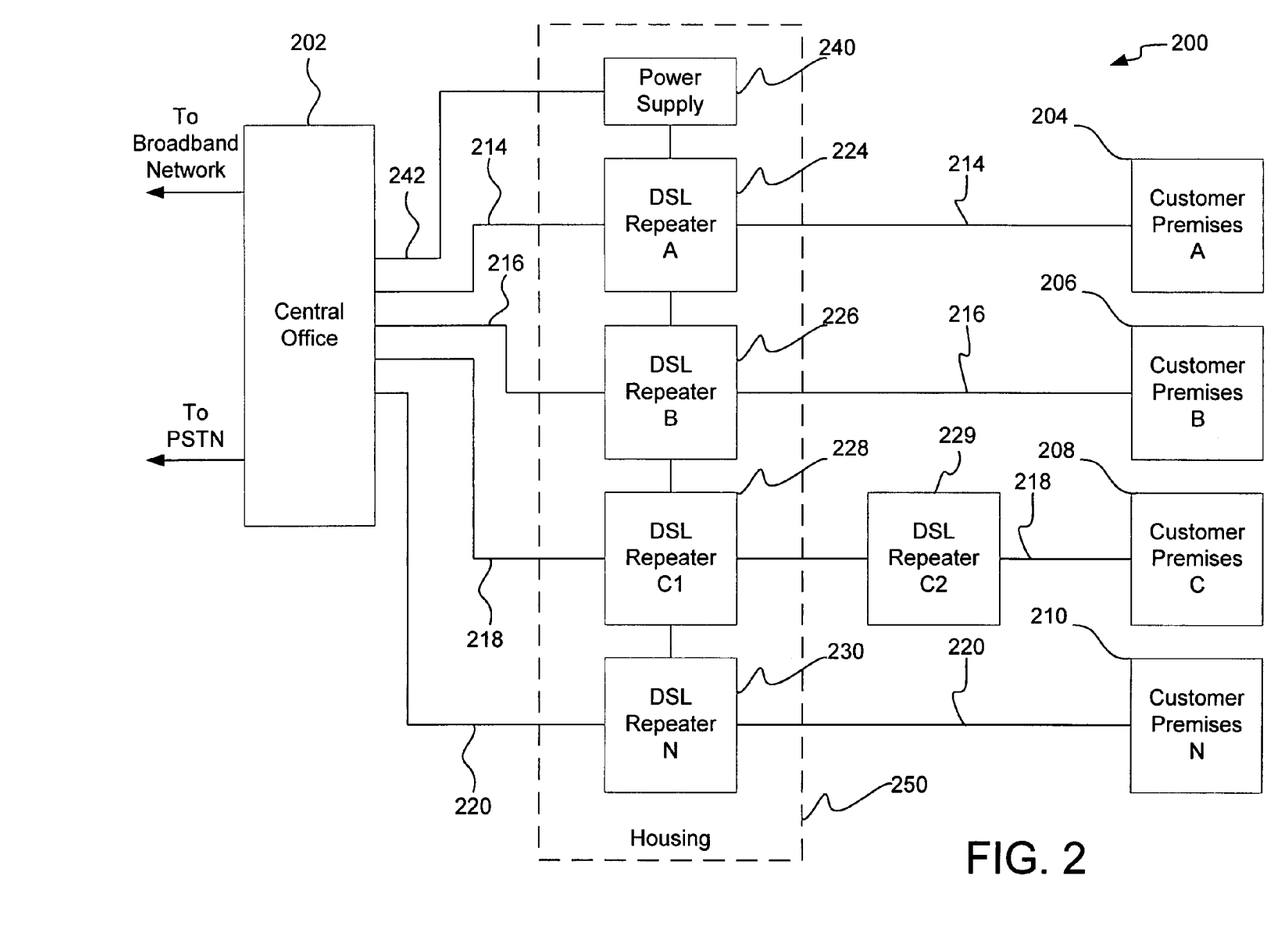
FIG. 2 illustrates multiple local loops interconnecting a central office and multiple customer premises with each local loop having at least one DSL repeater coupled thereto.

FIG. 2 illustrates a DSL network 200 that includes a central office 202, customer premises A 204, customer premises B 206, customer premises C 208, and customer premises N 210. The customer premises 204, 206, 208, and 210 are respectively coupled to the central office by local loops 214, 216, 218, and 220. Each local loop comprises a twisted pair of copper wires, commonly know in the art as a "twisted pair." Typically, the copper wires are formed of 22, 24, or 26 AWG wire.

Moreover, as those skilled in the art will appreciate, the central office 202 and each of the customer premises 204, 206, 208, and 210 includes a DSL termination device, such as a DSL modem, for transmitting and receiving DSL signals over an associated local loop.

A DSL repeater 224 is coupled to the local loop 214 to amplify DSL signals, such as ADSL or VDSL signals, passing over the loop 214 between the central office 202 and the customer premises 204. As discussed above, DSL signals are generally attenuated as they travel along a local loop, such as the local loop 214. The repeater 224 is disposed along the loop 214 between the central office 202 and the customer premises 204 to at least partially compensate for the DSL signal attenuation by amplifying the transmitted DSL signals. Additional details of the repeater 224 are described below with reference to FIGS. 3–18.

In addition, a repeater 226 is coupled to the loop 216 between the central office 202 and the customer premises 206 to amplify DSL signals passing between the central office 202 and the customer premises 206. Likewise, a repeater 230 is disposed between the central office 202 and the customer premises 210 to amplify DSL signals passing therebetween. The repeaters 226 and 230 are configured the same as the repeater 224.

Further, FIG. 2 illustrates that multiple DSL repeaters may be coupled in series, or in cascaded fashion, to a single loop for amplifying transmitted DSL signals multiple times and in multiple locations between the customer premises and the central office to permit DSL signals to be transmitted over greater distances while still maintaining an acceptable DSL signal amplitude. Specifically, a DSL repeater 228 and a DSL repeater 229 are coupled in series to the loop 218, which couples the central office 202 and the customer premises 208. Pursuant to this configuration, the repeater 228 first amplifies a downstream DSL signal transmitted from the central office 202 over the loop 218 to the customer premises 208 and the repeater 229 then amplifies the downstream signal again.

Hence, the repeater 228 amplifies the downstream signal to at least partially compensate for the attenuation incurred as the downstream signal passes over the portion of the loop 218 between the central office 202 and the repeater 228. Next, the repeater 229 amplifies the downstream signal to at least partially compensate for the attenuation incurred as the downstream signal passes from the repeater 228 to the repeater 229.

Likewise, for upstream DSL signals from the customer premises 208 to the central office 202, the repeater 229 amplifies the upstream signals to at least partially compensate for the attenuation that occurs between the customer premises 208 and the repeater 229. Next, the repeater 228 amplifies the upstream signal to at least partially compensate for the attenuation incurred as the upstream signal passes from the repeater 229 over the local loop 218 to the repeater 228.

According to one embodiment, the loop distance between the repeaters 228 and 229 is between about 5,000 and 7,000 feet. In a preferred embodiment, the loop distance between the repeaters is about 6,000 feet. As discussed in more detail below, this loop distance between multiple repeaters disposed in series, in cascaded fashion, along a single loop may be advantageous in that pursuant to one embodiment of the present system and method, each repeater may be adapted with POTS load coils (see FIG. 3). This embodiment may then replace conventional POTS load coils, which are typically disposed about every 6,000 feet along a loop, to provide both POTS load and DSL signal amplification functionality. Additional details of this embodiment are discussed below.

The loop 218 is illustrated as having two cascaded DSL repeaters 228 and 229 coupled thereto between the central office 202 and the customer premises 208. It should be noted, however, that additional DSL repeaters (not shown) may be disposed in series between the central office 202 and the customer premises 208 so that DSL signals may be effectively transmitted over an even longer loop 218 by being amplified multiple times by multiple DSL repeaters.

In the embodiment illustrated in FIG. 2, the DSL repeaters 224, 226, 228, and 230 receive electrical power from a power supply 240, which preferably receives power over a twisted pair 242 from the central office 202. The twisted pair 242 is a dedicated twisted pair that delivers DC current to the power supply 240 in the same manner in which electrical power is conventionally provided to T1 line repeaters. While not separately illustrated, the repeater 229 may receive power from a separate dedicated twisted pair or may receive power from the power supply 240. Lastly, the power supply 240; the DSL repeaters 224, 226, 228, and 230; and the associated circuitry may be disposed in a common housing 250.

Figure 3:
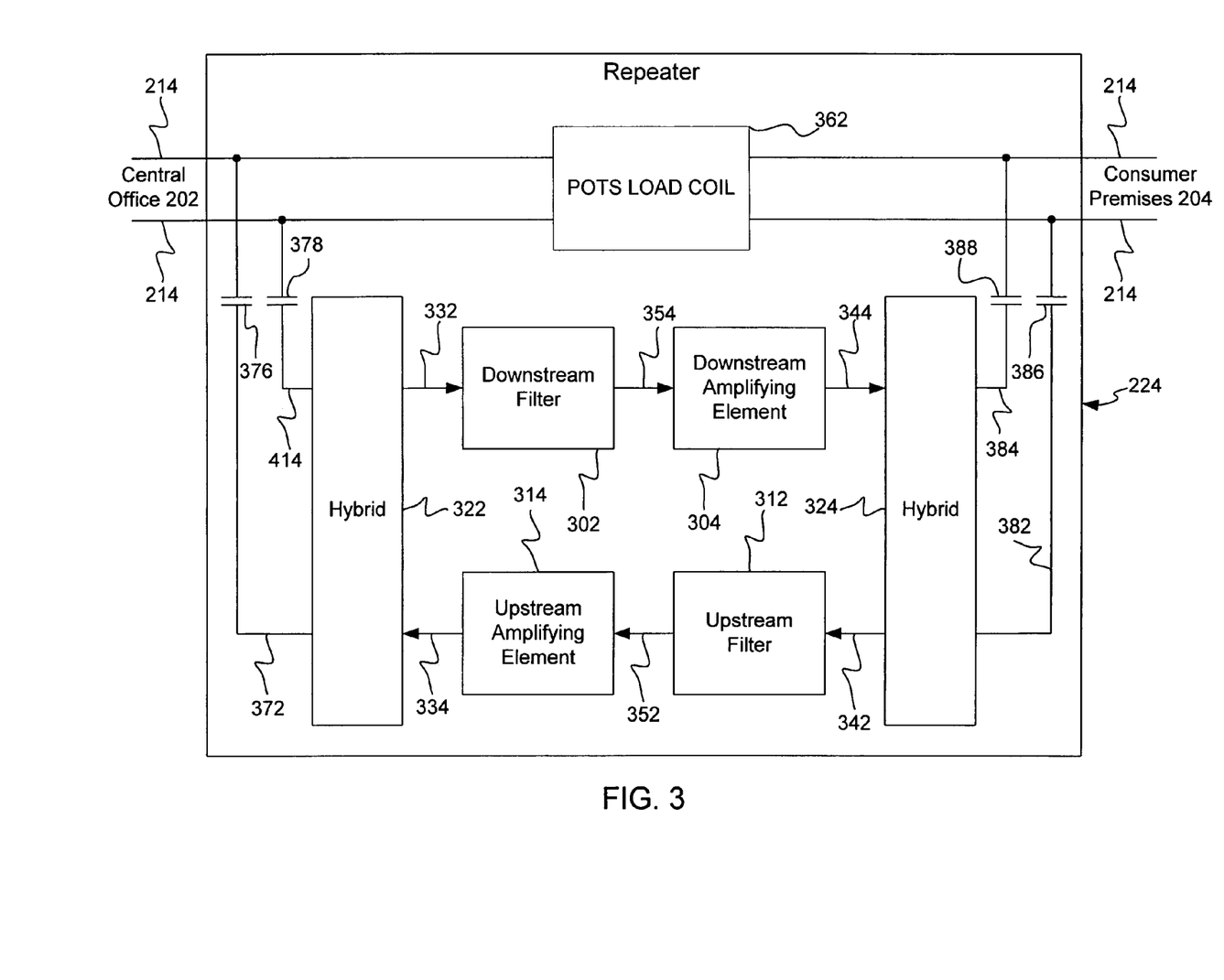
FIG. 3 illustrates one embodiment of a FIG. 2 repeater.

FIG. 3 illustrates details of one embodiment of the repeater 224 of FIG. 1. As shown, the repeater 224 is coupled to the local loop 214 between the central office 202 and the customer premises 204. The repeater 224 is depicted as including a downstream filter 302 and a downstream amplifying element or stage 304 and an upstream filter 312 and an upstream amplifying element or stage 314. The filters 302 and 312 and the amplifying elements 304 and 314 are disposed between a pair of electromagnetic hybrid couplers 322 and 324. The amplifying elements 304 and 314 may comprise amplifiers or amplifying equalizers.

In general, the hybrid coupler 322 receives downstream DSL signals from the central office 202 along the local loop 214 and outputs the downstream DSL signals to the downstream filter 302 along line 332. The hybrid coupler 322 also receives amplified upstream DSL signals from the upstream amplifying element 314 along line 334 and transmits the upstream DSL signals onto the local loop 214 for transmission to the central office 202.

Similarly, the hybrid coupler 324 receives upstream DSL signals from the customer premises 204 along the local loop 214 and outputs the upstream DSL signals to the upstream filter 312 along line 342. The hybrid coupler 324 also receives amplified downstream DSL signals from the downstream amplifying element 304 along line 344 and transmits the downstream DSL signals onto the local loop 214 for transmission to the customer premises 204.

As those skilled in the art will appreciate, where the hybrid coupler 322 is imperfect, at least a portion of the upstream amplified DSL signal received via the line 334 will leak through the hybrid coupler 322 onto the line 332. Likewise, where the hybrid coupler 324 is imperfect, at least a portion of the downstream amplified DSL signal received via the line 344 will leak through the hybrid coupler 324 onto the line 342. Without the presence of the filters 302 and 312, this DSL signal leakage could cause a phenomenon known in the art as "singing"—that is oscillations caused by introducing gain into a bi-directional system due to signal leakage.

The signal leakage problem is overcome, or substantially alleviated, through the use of the downstream filter 302 and the upstream filter 312. One version of Category 1 ADSL upstream signals generally occupy the frequency spectrum between about 25–120 kHz and ADSL downstream signals generally occupy the frequency spectrum between about 150 kHz–1.104 MHz. The downstream filter 302 substantially prevents leaked upstream signals from being transmitted back to the customer premises 204 by significantly attenuating signals between 25 kHz and 120 kHz for ADSL. Likewise, the upstream filter 312 is configured to provide significant attenuation to signals between about 150 kHz–1.104 MHz for ADSL. For other varieties of DSL, such as VDSL, the filters 302 and 312 respectively attenuate signals outside the downstream and upstream frequency bands, although the limits of these bands may be different than those for the ADSL variety.

In operation, the repeater 224 receives upstream DSL signals from the customer premises 204 via the hybrid 324, filters out, or substantially attenuates, signals in the downstream frequency band with the upstream filter 312 and then passes the filtered upstream signal to the upstream amplifying element 314 via line 352 for amplification. The repeater 224 then passes the amplified upstream DSL signal onto the loop 214 for transmission to the central office 202. Similarly, the repeater 224 receives downstream DSL signals from the central office 202 via the hybrid 322, filters out, or substantially attenuates, signals in the upstream frequency band with the downstream filter 302 and then passes the amplified downstream signal to the downstream amplifying element 304 via line 354 for amplification. The repeater 224 then passes the amplified downstream DSL signal onto the loop 214 for transmission to the customer premises.

In addition, the repeater 224 of FIG. 3 includes load coil 362 coupled to the loop 214 to improve transmission of voice, or POTS, frequency signals over long loop lengths, such as those longer than about 18,000 feet. Conventional POTS load coils typically consist of two windings wound on the same core, acting as one balanced inductor. A value of 88 mH is typical for the total effective inductance of a conventional load coil. Details of various embodiments of the present load coil are described below.

Further, the hybrid 322 is illustrated as being capacitively coupled to the local loop on the central office, or upstream, side of the load coils 362 along lines 372 and 374. A capacitor 376 (100 nF) is disposed along the line 372 and a capacitor 378 (100 nF) is disposed along the line 374 to capacitively couple the hybrid 322 to the loop 214 on the central office side of the load coils 362.

Similarly, the hybrid 324 is illustrated as being capacitively coupled to the local loop 214 on the customer premises, or downstream, side of the load coils 362 along lines 382 and 384. A capacitor 386 (100 nF) is disposed along the line 382 and a capacitor 388 (100 nF) is disposed along the line 384 to capacitively couple the hybrid 324 to the loop 214 on the customer premises side of the load coils 362.

Additional details of the components comprising the DSL repeater 224 of FIG. 3 are described in the related applications identified above incorporated herein by reference.

The load coil 362 is present in the repeater 224 to block, or significantly attenuate, DSL frequency signals, such as ADSL signals, while improving the transmission of POTS-band signals over the loop 214. The load coil 362 also serves to provide sufficient impedance between the central office-side of the repeater 224 and the consumer premises-side of the repeater 224 so that significant gain can be developed across the load coil. Indeed, the DSL repeater 224 equalizes and amplifies ADSL-band signals found one side of the load coil 362, and presents the amplified signals to the other side of the load coil 362. At 1, 104 kHz, there can be as much as 40 dB of gain, or difference, between one side of the load coil and the other. It is desirable, therefore, for the load coil 362 to present high impedance to DSL-band frequencies to develop a significant voltage difference across the POTS load coil 362.

Figure 4:
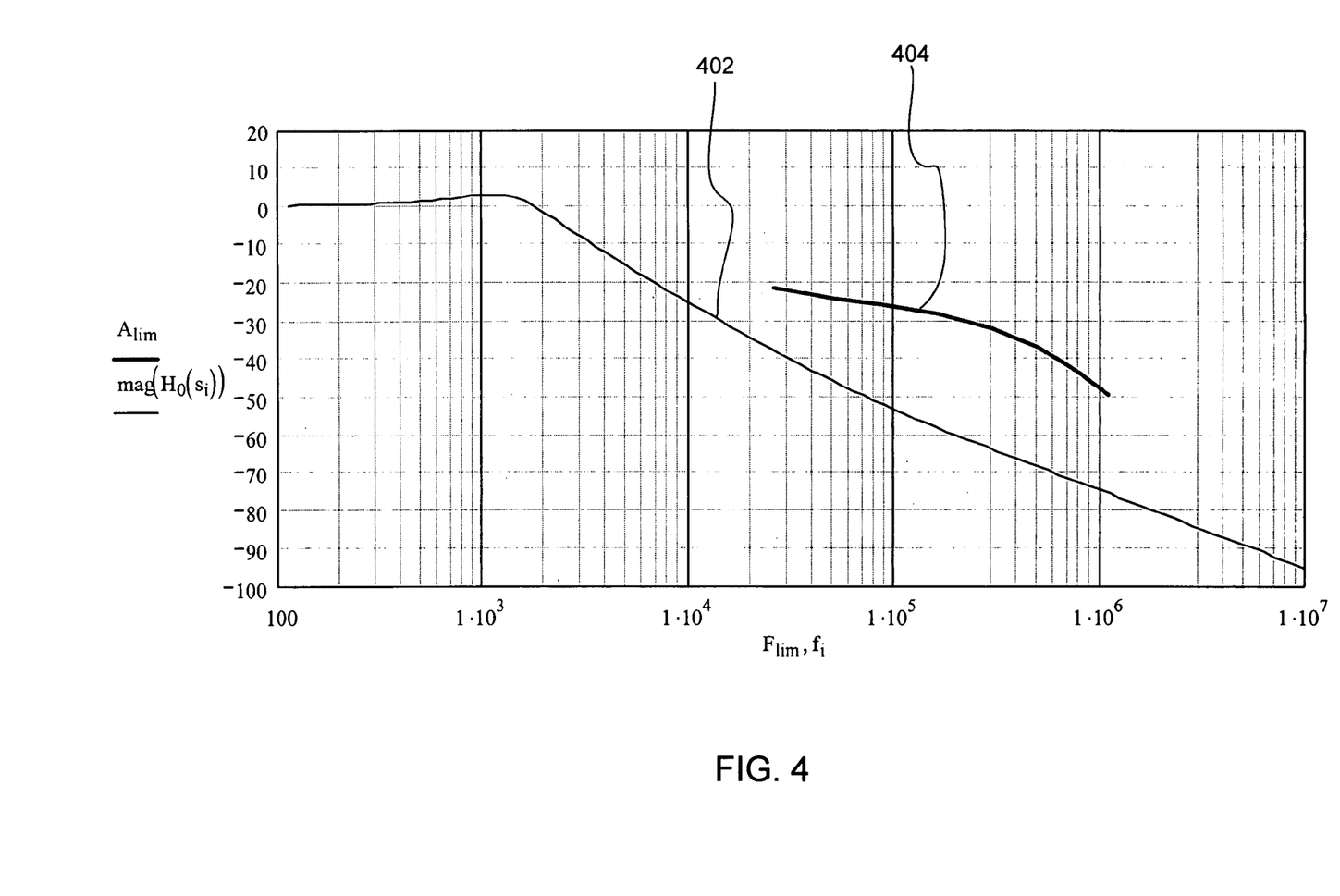
FIG. 4 illustrates the transfer function of a load coil having no inter-winding or intra-winding capacitance.

FIG. 4 illustrates the transfer function of an ideal load coil having no inter-winding or intra-winding capacitance with a line impedance of about 100 ohms. In particular, FIG. 4 illustrates the transfer function magnitude $V_{in}$(the voltage on one side of the coil) to $V_{out}$(the voltage on the other side of the coil) as a function of frequency for an ideal load coil as curve 402. Preferably, this transfer function shown by curve 402 will fall below a limit curve 404. The limit curve 404 is determined by the desired gain to be developed across the load coil 362, plus suitable margin. The limit curve 404 is an example of such a curve.

As can be seen in FIG. 4, an ideal load coil, that is, a load coil with no inter-winding or intra-winding capacitance, functions acceptably. Indeed, for the ADSL frequencies of interest (about 25 kHz to about 1.1 MHz), the transfer function 402 is well below the limit curve 404.

Figure 5:
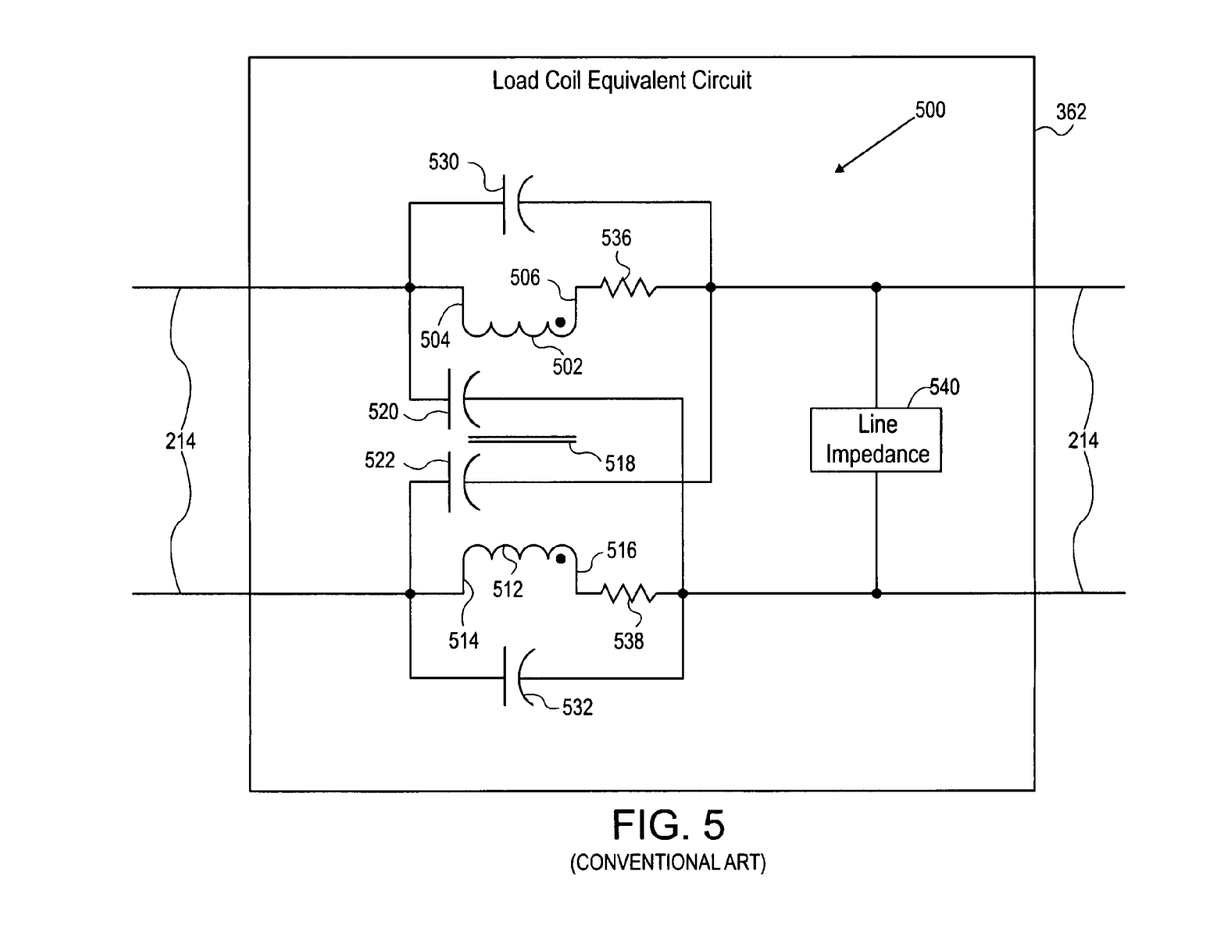
FIG. 5 illustrates an equivalent circuit of a conventional load coil.

FIG. 5 illustrates an equivalent circuit 500 of a balanced coupled inductor, such as the type used in conventional load coils. As those skilled in the art will appreciate, real-world load coils are not ideal in that they typically include some inter-winding capacitance, some intra-winding capacitance, and some impedance. The equivalent circuit 500 includes a winding 502 having legs 504 and 506. The equivalent circuit 500 also includes a winding 512 having legs 514 and 516. Taken individually, each of the windings 502 and 512 typically has an inductance of about 22 mH. Because the windings 502 and 512 are disposed in series and are wound about a common core 518, the total effective inductance of the windings 502 and 512 wrapped about the core 518 is about 88 mH.

The equivalent circuit 500 also includes capacitors 520 and 522, which model, or represent the inter-winding capacitance of a conventional load coil. As shown, the capacitor 520 is disposed between the leg 504 of the winding 502 and the leg 516 of the winding 512. Similarly, the capacitor 522 is disposed between the leg 506 of the winding 502 and the leg 514 of the winding 512. To model the inter-winding capacitance of one embodiment of a conventional load coil, the capacitors 520 and 522 each have a capacitance of about 1,040 pF.

In addition, the equivalent circuit 500 includes capacitors 530 and 532, which model, or represent the intra-winding capacitance of a conventional load coil. The capacitor 530 is illustrated as being disposed between the legs 504 and 506 of the winding 502. Likewise, the capacitor 532 is illustrated as being disposed between the legs 514 and 516 of the winding 512. To model the intra-winding capacitance of one embodiment of a conventional load coil, the capacitors 530 and 532 each have a capacitance of about 10 pF. Further, the conventional load coil also includes some impedance as represented by resistors 536 and 538, which each have a 6-ohm impedance.

Lastly, to model the impedance of the line 214, a line impedance 540 is shown as being disposed between the wires of the line 214. The line impedance at high frequencies, such as frequencies in the ADSL band, is about 100 ohms.

Figure 6:
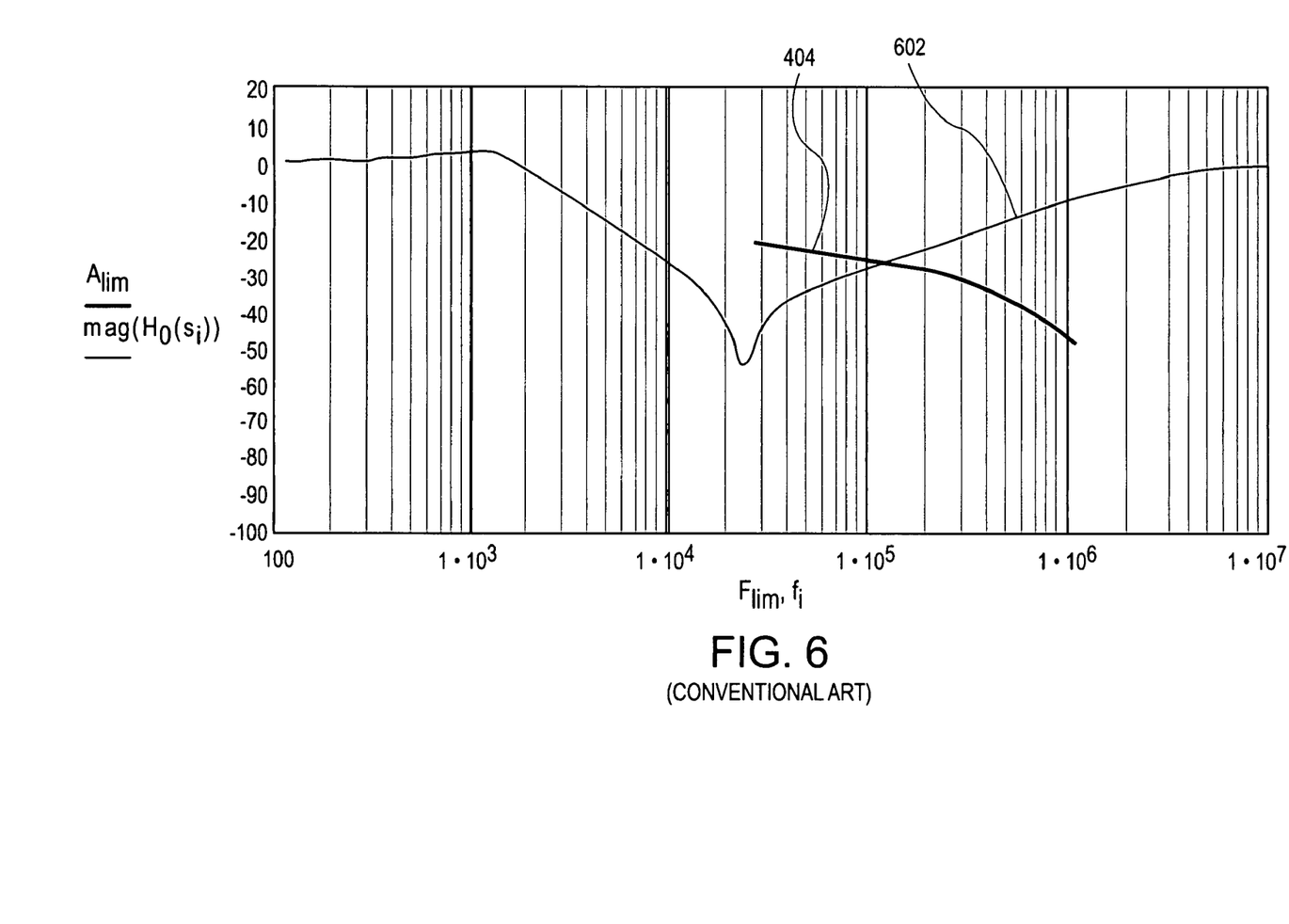
FIG. 6 illustrates the transfer function of a conventional load coil.

FIG. 6 illustrates the transfer function 602 of one embodiment of a conventional load coil having the inter-winding capacitance, the intra-winding capacitance, and impedance described above in FIG. 5 superimposed with the limit curve 404 described above with reference to FIG. 4. As shown, the transfer function 602 of a conventional load coil does not fall below the limit curve 404 for all ADSL frequencies and, therefore, may not be suitable for many applications of the DSL repeater 224 of FIG. 3. Indeed, for 1 MHz ADSL signals, a conventional load coil will allow for little, if any, gain to be developed across the load coil where over 40 dB of gain is desirable.

Figure 7:
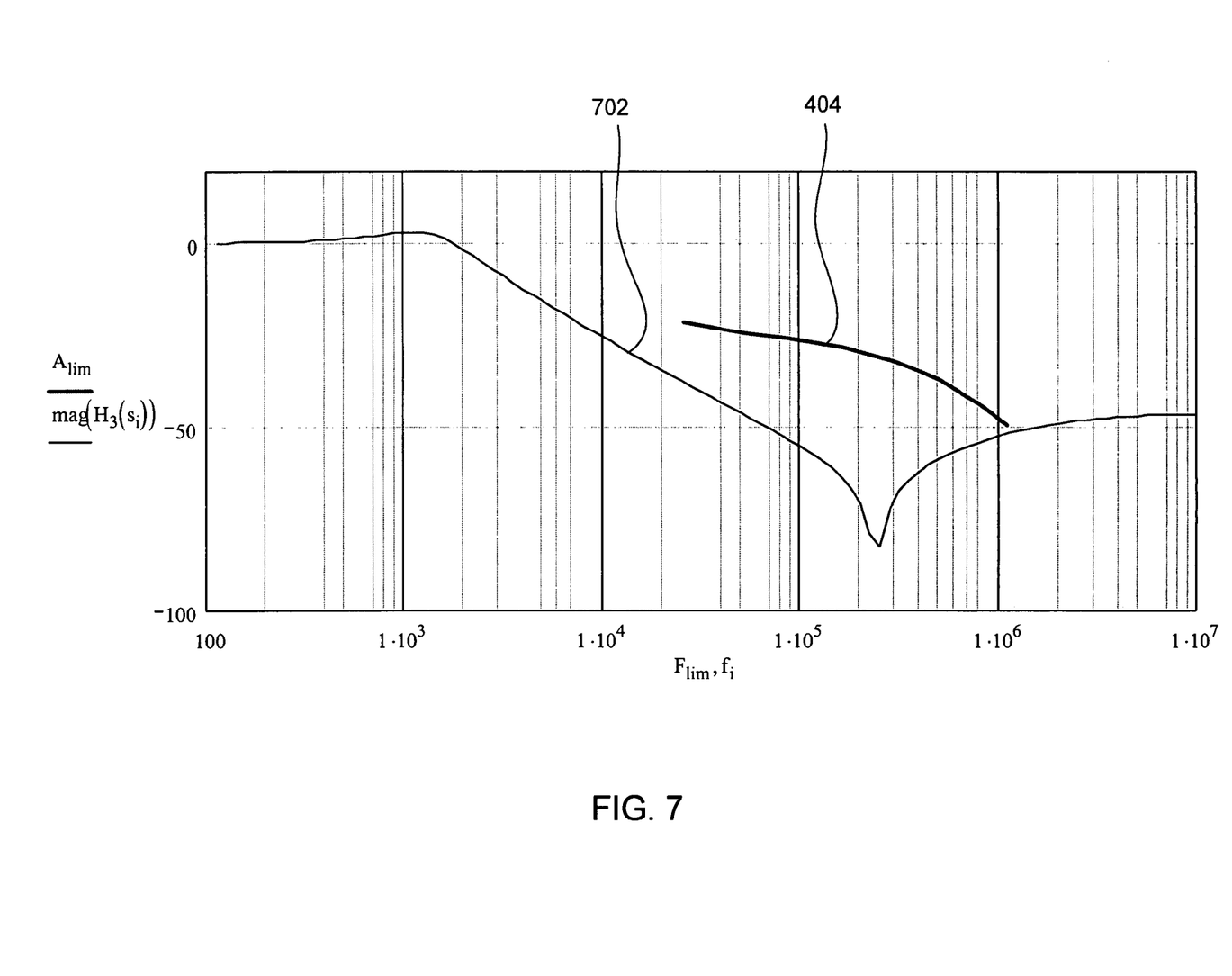
FIG. 7 illustrates the transfer function of a load coil according to one embodiment of the present load coil.

FIG. 7 illustrates a transfer function 702 of a load coil in accordance with the present disclosure superimposed with the limit curve 404 described above with reference to FIG. 4. It has been determined that a suitable load coil 362 (FIG. 3) for a DSL repeater 224 will advantageously have little, if any, effective capacitance. In one embodiment, the ratio of the effective inter-winding capacitance to the effective intra-winding capacitance is advantageously in the range of 0.75–1.25 and preferably in the range of 1.01–0.99.

The transfer function 702 results from one embodiment of a load coil having about 88 mH effective inductance, about 10 pF inter-winding capacitance, about 10 pF intra-winding capacitance, and about 6 ohms resistance. As shown, the transfer function 702 falls below the limit curve 404 for all ADSL frequencies and, therefore, such a load coil will provide sufficient impedance to high frequencies that sufficient gain can be developed across the load coil. As those skilled in the art will appreciate, however, manufacture of a conventional coupled inductor load coil with only about 10 pF of inter-winding capacitance is difficult, if possible at all.

Figure 8:
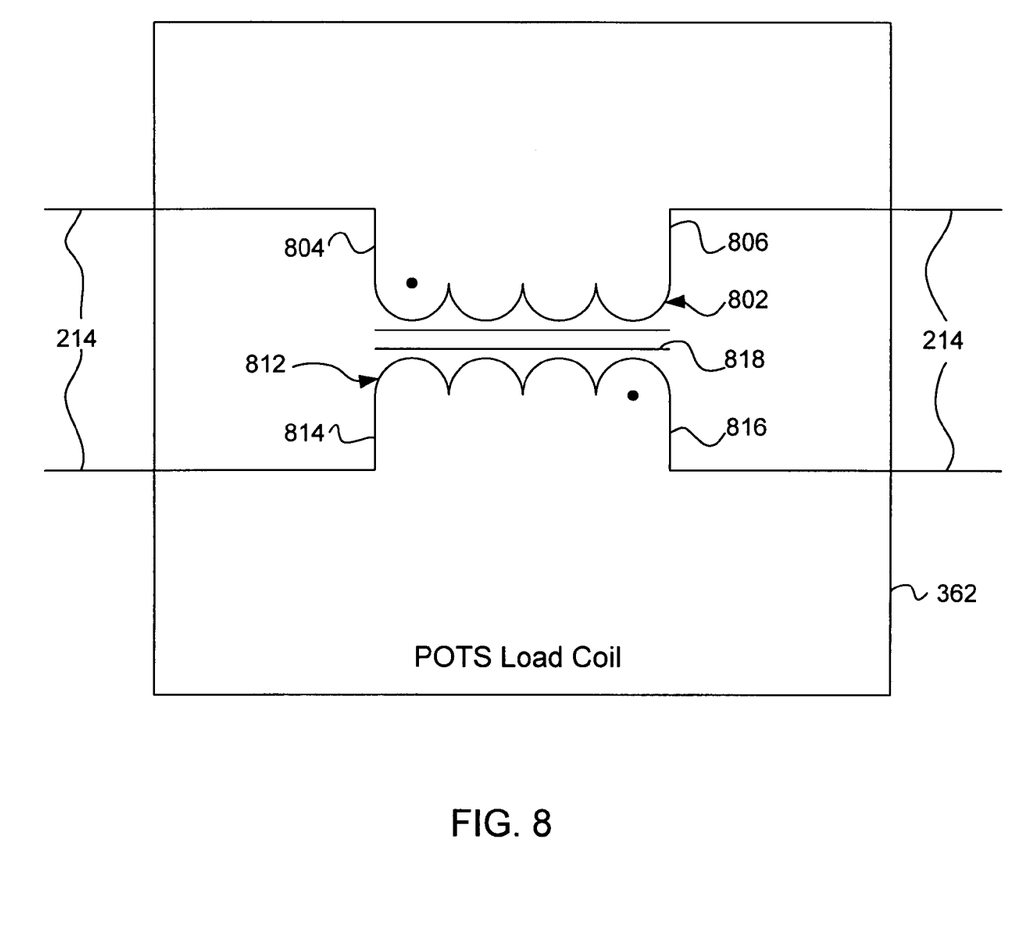
FIG. 8 illustrates one embodiment of the present load coil.

FIG. 8 illustrates one embodiment of the present load coil 362. The load coil 362 of FIG. 8 includes a winding 802 and a winding 812. The winding 802 is coupled to the loop 214 via legs 804 and 806. Similarly, the winding 812 is coupled to the loop 214 via legs 814 and 816. The windings 802 and 812 are wound about a single core 818. In this embodiment, the load coil includes sufficient intra-winding capacitance (i.e. the capacitance measured between the legs 804 and 806 of the winding 802) to counter-balance, or substantially counter-balance, the inter-winding capacitance (i.e. the capacitance measured between the leg 804 of the winding 802 and the leg 816 of the winding 812). That is, the ratio of the inter-winding capacitance to the intra-winding capacitance is in the range of 0.75–1.25 and preferably in the range of 0.99–1.01. In one embodiment, where the inter-winding capacitance is about 1,040 pF, the intra-winding capacitance should be in the range of about 780–1,300 pF and is advantageously in the range of about 1,030–1,050 pF. By closely matching the effective intra-winding and inter-winding capacitances, the amount of capacitively conducted current at DSL frequencies through the FIG. 8 load coil is significantly reduced.

As those skilled in the art will appreciate, the intra-winding capacitance measured between the legs 804 and 806 of the winding 802 will be very close, if not equal to, the intra-winding capacitance measured between the legs 814 and 816 of the winding 812. Accordingly, for purposes of the present disclosure, the intra-winding capacitance of a load coil may typically be measured between the legs of either the first winding or the second winding.

Figure 9:
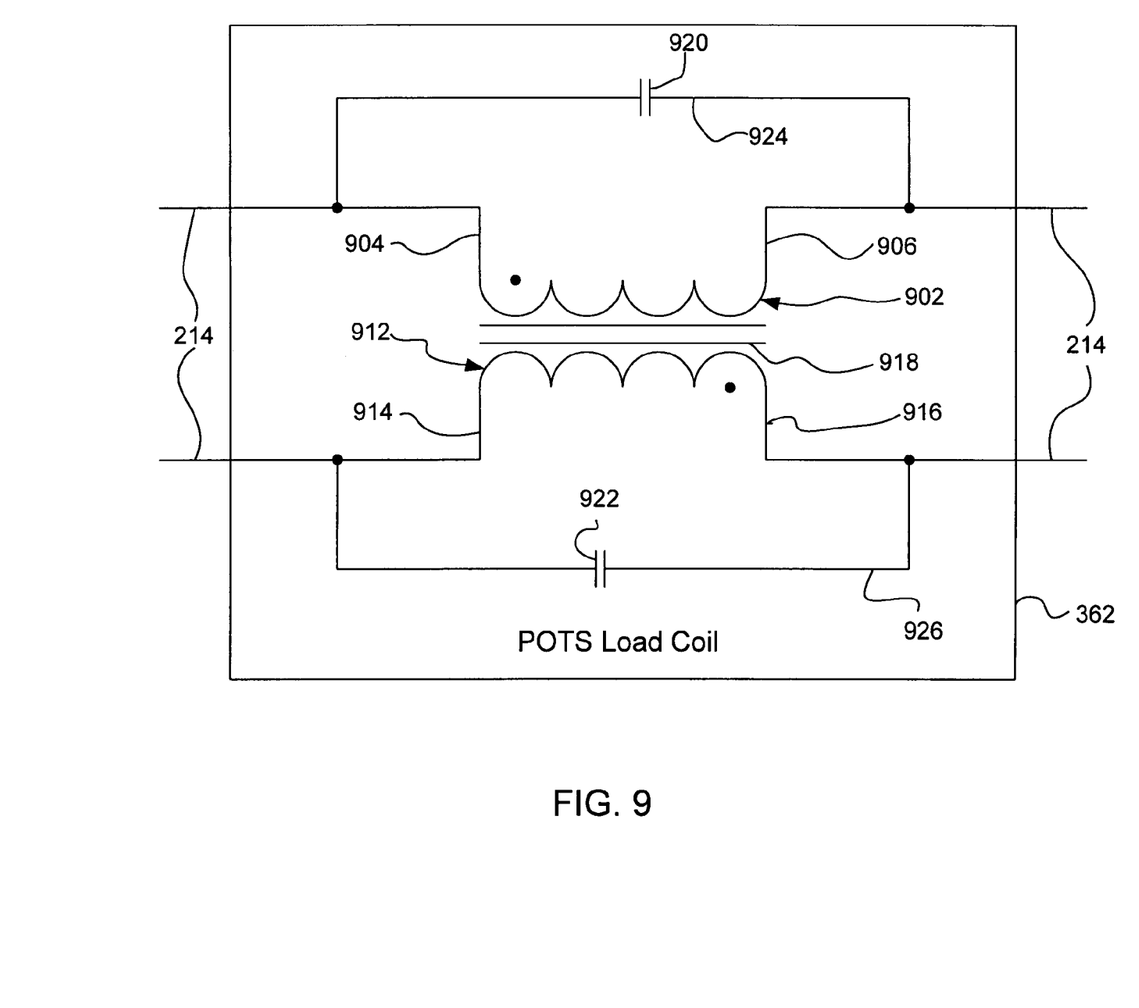
FIG. 9 illustrates another embodiment of the present load coil.

FIG. 9 illustrates another embodiment of a load coil 362 according to the present system and method. This embodiment of the load coil 362 includes a winding 902 and a winding 912. The winding 902 is coupled to the loop 214 via legs 904 and 906. Similarly, the winding 912 is coupled to the loop 214 via legs 914 and 916. The windings 902 and 912 are wound about a single core 918.

The FIG. 9 load coil also includes compensating capacitors 920 and 922 for counter-balancing, or substantially counter-balancing, the inter-winding capacitance of the load coil. As shown, the capacitor 920 is disposed between the legs 904 and 906 of the winding 902 along line 924. Similarly, the capacitor 922 is disposed between the legs 914 and 916 of the winding 912.

The compensating capacitors 920 and 922 preferably each have a capacitance that approximates the inter-winding capacitance, as measured between the leg 904 of the winding 902 and the leg 916 of the winding 912, minus the intra-winding capacitance, as measured between the legs 904 and 906 of the winding 902 without the presence of the capacitor 920, ± about 25% and preferably ± about 1%. For example, therefore, if the FIG. 9 load coil had an inter-winding capacitance of about 1,040 pF and an intra-winding capacitance of about 10 pF, then each compensating capacitor 920 and 922 should have a capacitance in the range of about 770–1,290 pF and advantageously in the range of about 1,020–1,040 pF. In this configuration, the capacitively conducted current through the load coil 362 is substantially reduced or alleviated, thereby permitting the desired gain to be developed across the load coil 362 for ADSL frequencies.

Figure 10:
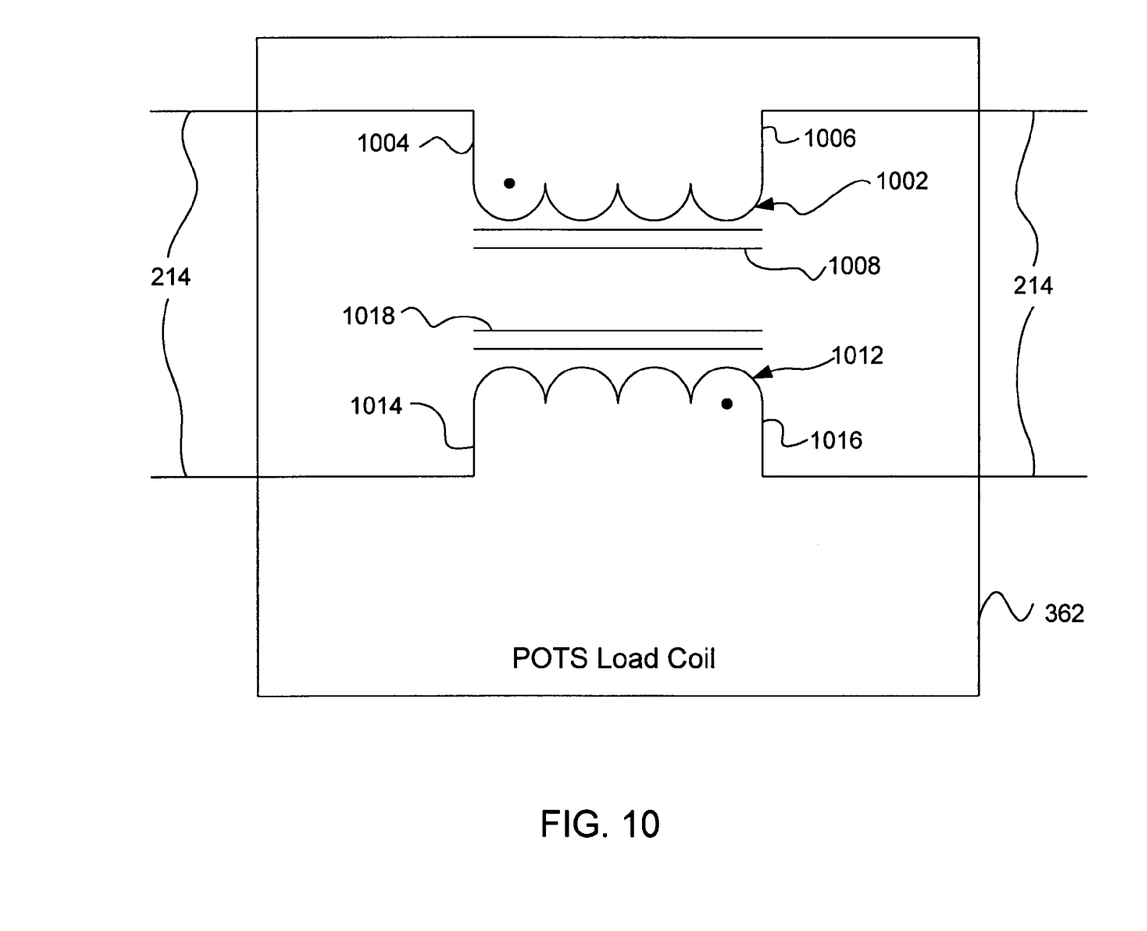
FIG. 10 illustrates yet another embodiment of the present load coil.

FIG. 10 illustrates another embodiment of the load coil 362. This embodiment includes two discrete, uncoupled inductors. The first uncoupled inductor is shown as having a winding 1002, legs 1004 and 1006, and a core 1008. Similarly, the second uncoupled inductor includes a winding 1012, legs 1014 and 1016, and a core 1018. Each of the inductors advantageously has an inductance of about 44 mH so that the total effective inductance of the FIG. 10 load coil is about 88 mH.

By providing a load coil with discrete, uncoupled inductors, rather than the conventional coupled inductors, the inter-winding capacitance of the FIG. 10 load coil (i.e. the capacitance between the leg 1004 and the leg 1016) is substantially reduced or eliminated. Further, in this embodiment, the intra-winding capacitance of each of the windings 1002 and 1012 is advantageously small, such as less than about 10 pF, so that the intra-winding capacitance of the FIG. 10 load coil does not prevent the FIG. 10 load coil from presenting sufficient impedance to signals in the range of about 25 kHz–1.1 MHz.

Figure 11:
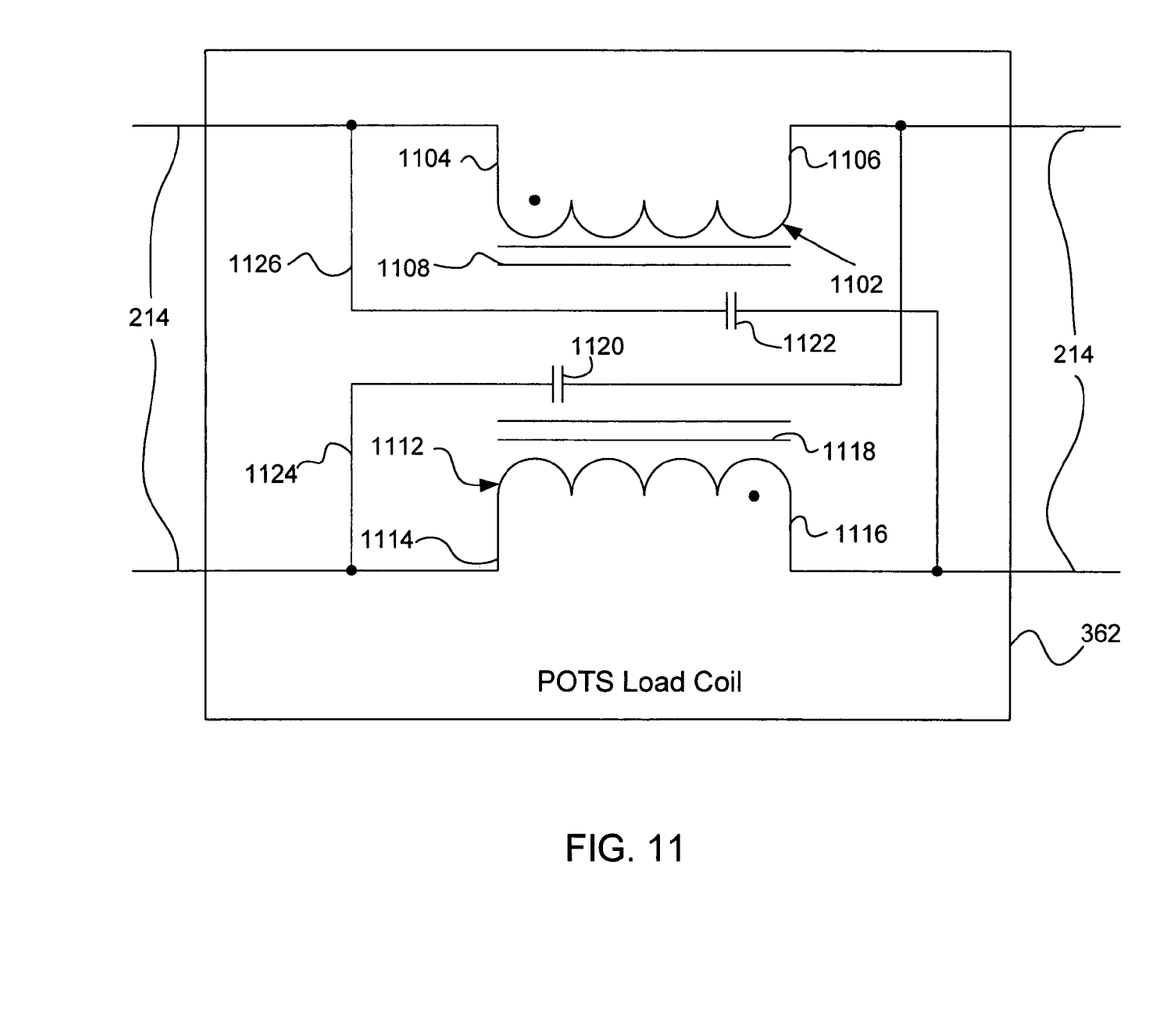
FIG. 11 illustrates still another embodiment of the present load coil.

FIG. 11 illustrates another embodiment of the load coil 362. This embodiment includes two discrete, uncoupled inductors. The first uncoupled inductor is shown as having a winding 1102, legs 1104 and 1106, and a core 1108. Similarly, the second uncoupled inductor includes a winding 1112, legs 1114 and 1116, and a core 1118. Each of the inductors advantageously has an inductance of about 44 mH so that the total effective inductance of the FIG. 11 load coil is about 88 mH. By providing a load coil, such as the load coil 11, with discrete, uncoupled inductors, rather than the conventional coupled inductors, the inter-winding capacitance of the FIG. 11 load coil is substantially eliminated.

The FIG. 11 load coil also includes compensating capacitors 1120 and 1122 to counter-balance any significant intra-winding capacitance of the windings 1102 and 1112. Each of the windings 1102 and 1112 may have significant intra-winding capacitance as measured between the legs of each winding. That is, the intra-winding capacitance of the winding 1102 is the capacitance as measured between the legs 1104 and 1106. Likewise, the intra-winding capacitance of the winding 1104 is the capacitance as measured between the legs 1114 and 1116. Without being effectively counter-balanced by the capacitors 1120 and 1122, the intra-winding capacitance of the windings 1102 and 1112 may adversely affect the ability of the load coil to present sufficient impedance to ADSL signals to permit significant gain to be developed across the load coil 362 of FIG. 11.

To counter-balance the intra-winding capacitances of the windings 1102 and 1104, the capacitor 1120 is disposed between the leg 1114 of the winding 1112 and the leg 1106 of the winding 1102 along line 1124 and the capacitor 1122 is disposed between the leg 1104 of the winding 1102 and the leg 1116 of the winding 1112 along line 1126. Advantageously, each of the capacitors 1120 and 1122 has a capacitance that approximates the intra-winding capacitance of one of the windings 1102 and 1112. Indeed, in one embodiment, the ratio of the capacitance of one of the capacitors 1120 and 1122 to the intra-winding capacitance of one of the windings 1102 and 1112 is in the range of 0.75–1.25, and in another embodiment, this ratio is in the range of about 0.99–1.01.

The invention has been described above with reference to specific embodiments. It will, however, be evident that various modifications and changes may be made thereto without departing from the broader spirit and scope of the invention. The foregoing description and figures are, accordingly, to be regarded in an illustrative rather than a restrictive sense.

What is claimed is:

1. A DSL repeater for improving transmission of POTS band and DSL band signals over a local loop, the repeater comprising:

an upstream signal amplifier for amplifying upstream DSL signals;

a downstream signal amplifier for amplifying downstream DSL signals; and a load coil disposed in parallel with the upstream and downstream signal amplifiers for improving the transmission of POTS band signals over the local loop, wherein the load coil comprises:

a first inductor including a first winding and a first core, the first winding having upstream and downstream ends and a first intra-winding capacitance;

a second inductor including a second winding and a second core, the second winding having upstream and downstream ends and having a second intra-winding capacitance;

a first compensating capacitor disposed between the upstream end of the first inductor and the downstream end of the second inductor to offset at least a portion of the first and second intra-winding capacitances for improving the impedance of the load coil to DSL-band signals; and a second compensating capacitor disposed between the upstream end of the second inductor and the downstream end of the first inductor to offset at least a portion of the first and second intra-winding capacitances for improving the impedance of the load coil to DSL-band signals.

2. The DSL repeater of claim 1 wherein the first and second compensating capacitors have respective first and second compensating capacitances;

the first and second capacitances approximate the first and second intra-winding capacitances respectively and the first and second compensating capacitors act to counterbalance the first and second intra-winding capacitances respectively.

3. The DSL repeater of claim 2 wherein the ratio of the first compensating capacitance to the first intra-winding capacitance is in the range of 0.75 to 1.25.

4. The DSL repeater of claim 2 wherein the ratio of the first compensating capacitance to the first intra-winding capacitance is in the range of 0.99 to 1.01.

5. The DSL repeater of claim 1 wherein:

the first and second compensating capacitors each have capacitances in the range 770 pF to 1290 pF.

* * * * *